United States Patent
Baker et al.

[11] Patent Number: 6,009,372
[45] Date of Patent: Dec. 28, 1999

[54] MANAGEMENT OF PROGRAMMING AND MEMORY SPACE FOR AN INTERNAL COMBUSTION ENGINE CONTROL SYSTEM

[75] Inventors: Danny R. Baker, Columbus; Thane Morgan, Greenwood, both of Ind.

[73] Assignee: Cummins Engine Company, Inc., Columbus, Ind.

[21] Appl. No.: 08/942,307

[22] Filed: Oct. 1, 1997

[51] Int. Cl.⁶ .......................... G06F 19/00; F02D 29/00
[52] U.S. Cl. .......................................................... 701/115
[58] Field of Search ............................... 701/115, 102; 711/117, 202

[56] References Cited

U.S. PATENT DOCUMENTS

| | | | |
|---|---|---|---|
| 4,348,729 | 9/1982 | Sasayama et al. | 701/115 |
| 4,360,840 | 11/1982 | Wolfrum et al. | 358/261.1 |
| 4,751,633 | 6/1988 | Henn et al. | 714/18 |
| 4,908,792 | 3/1990 | Przybyla et al. | 701/102 |
| 5,051,745 | 9/1991 | Katz | 341/51 |
| 5,138,548 | 8/1992 | Kienle | 714/48 |
| 5,159,336 | 10/1992 | Rabin et al. | 341/51 |
| 5,235,696 | 8/1993 | Schaff | 711/202 |
| 5,247,446 | 9/1993 | Motz et al. | 701/115 |
| 5,384,567 | 1/1995 | Hassner et al. | 341/51 |
| 5,428,357 | 6/1995 | Haab et al. | 341/155 |
| 5,440,718 | 8/1995 | Kumagai et al. | 711/154 |
| 5,446,665 | 8/1995 | Adrian et al. | 701/102 |
| 5,455,578 | 10/1995 | Bhandari | 341/51 |
| 5,455,923 | 10/1995 | Kaplinsky | 711/154 |
| 5,488,366 | 1/1996 | Wu | 341/67 |
| 5,523,948 | 6/1996 | Adrain | 701/99 |
| 5,539,401 | 7/1996 | Kumaki et al. | 341/67 |
| 5,548,574 | 8/1996 | Shimoyoshi et al. | 369/124 |
| 5,710,703 | 1/1998 | Kirn et al. | 701/29 |
| 5,806,015 | 9/1998 | Kimoto et al. | 701/115 |
| 5,884,211 | 3/1999 | Pauli et al. | 701/115 |

*Primary Examiner*—Willis R. Wolfe
*Assistant Examiner*—Hieu T. Vo
*Attorney, Agent, or Firm*—Woodard, Emhardt, Naughton, Moriarty & McNett Patent and Trademark Attorneys

[57] ABSTRACT

An internal combustion engine with an embedded control system is disclosed which includes a programmable controller operatively coupled to a nonvolatile memory and a volatile memory. The nonvolatile memory is loaded with programming instructions for the controller. In one embodiment, a portion of the programming instructions are provided in an unexecutable compressed format which are then selectively decompressed into an executable format by an executable routine loaded in another portion of the nonvolatile memory. In another aspect, a first loading program is executed by the controller to load data from external support equipment. This data includes a second loading routine. The downloaded data also includes a code substitution program which is executed to replace the first loading routine with the second loading routine.

40 Claims, 8 Drawing Sheets

MANAGEMENT OF PROGRAMMING AND MEMORY SPACE FOR AN INTERNAL COMBUSTION ENGINE CONTROL SYSTEM

BACKGROUND OF THE INVENTION

The present invention relates to techniques for managing programming and memory space of an internal combustion engine control system, and more particularly, but not exclusively, relates to management of a data loading routine residing in memory of an embedded internal combustion engine control system.

To improve performance of internal combustion engines, sophisticated control systems have been developed. These systems typically include a programmable control module that electronically regulates engine operation by adjusting various engine controls in response to information from engine sensors. Operations commonly controlled in this manner include fueling and ignition timing of the engine.

Engine control systems typically include a nonvolatile memory that must reliably retain one or more executable routines for long nonoperational periods over a wide range of temperature and humidity conditions. These high performance nonvolatile memory devices often become a significant source of expense for internal combustion engine control systems. Moreover, the difficulty and expense of adding nonvolatile memory devices in response to increasing processing needs for such systems is often prohibitive. Thus, there is a need for a technique to conserve memory for internal combustion engine control systems. Preferably, this conservation technique is implemented by software and does not impose significant hardware redesign.

Besides control system memory conservation, there are other unmet needs concerning this technology. For example, it is occasionally desired to change information loaded in the nonvolatile memory of the control system. This change may be needed to update various data constants, correct a control system programming glitch, or provide additional control system functions. For systems that store this information in Read Only Memory (ROM), such changes generally require physical replacement of the ROM devices. Even for systems that may have some type of reprogrammable nonvolatile memory, there remains the particularly challenging problem of how to replace a control system routine which itself performs loading of the nonvolatile memory.

The present invention meets these needs and provides other significant benefits and advantages.

SUMMARY OF THE INVENTION

The present invention relates to programming techniques for an internal combustion engine control system. Various aspects of the present invention are novel, nonobvious, and provide various advantages. While the actual nature of the invention covered herein can only be determined with reference to the claims appended hereto, certain features which are characteristic of the preferred embodiments disclosed herein are described briefly as follows.

One feature of the present invention is a technique to conserve memory space of an embedded control system. This technique includes a control system program having one portion loaded in memory in an executable form and another portion loaded in memory in an unexecutable, compressed form. The executable portion includes a decompression routine to expand the compressed portion when needed.

Another feature of the present invention relates to the operation of an internal combustion engine control system that includes a programmable controller operatively coupled to a first memory and a second memory. A number of compressed instructions for the controller are stored in the first memory of the control system in an unexecutable format. A number of executable instructions are provided from the compressed instructions by executing a compression decoding routine during operation of the control system. The executable instructions are stored in the second memory and occupy more memory space than the compressed instructions.

A further feature of the present invention includes the combination of an internal combustion engine and a control system that has a programmable controller operatively coupled to the engine. A nonvolatile memory is operatively coupled to the controller which is loaded with digital information, including a number of compressed instructions for the controller. A volatile memory is also operatively coupled to the controller. The controller is programmed to execute a compression decoding routine to generate a number of uncompressed controller instructions from the compressed controller instructions. The controller stores the uncompressed controller instructions in the volatile memory and executes these instructions from the volatile memory during operation of the engine. The compressed controller instructions occupy less memory space than the uncompressed controller instructions to conserve memory space of the system when the uncompressed controller instructions are not needed.

Still another feature includes operating an embedded control system of an internal combustion engine which is operatively coupled to the engine. The control system has a programmable controller operatively coupled to a nonvolatile memory loaded with digital information. The digital information includes a number of compressed controller instructions to conserve nonvolatile memory space of the control system. A first routine is performed with the controller during control system operation to generate a number of uncompressed controller instructions from the compressed controller instructions. The uncompressed controller instructions are executed with the controller.

Other features of the present invention include an embedded control system of an internal combustion engine that has an initial loading routine to download information from an external source. The downloaded information includes a replacement loading routine and a code substitution routine. The code substitution routine is executed to install the replacement loading routine in place of the initial loading routine.

Another feature includes an embedded control system with a programmable controller operatively coupled to an internal combustion engine, a communication interface for selective coupling to support equipment to receive digital information, and a nonvolatile memory operatively coupled to the controller. The nonvolatile memory includes a first loading routine executed by the controller to download data from the support equipment when the support equipment is coupled to the communication interface. The controller is responsive to an input to execute a code replacement routine residing in the nonvolatile memory which replaces the first loading routine with a second loading routine defined by the data downloaded with the first routine.

In yet another feature, support equipment is operatively interfaced with an embedded control system of an internal combustion engine. The control system is operatively coupled to the engine and includes a programmable controller operatively coupled to a nonvolatile memory. Data is downloaded from the support equipment by executing a first loading routine with the controller. The first loading routine resides in the nonvolatile memory. A code replacement routine is executed with the controller after the download. It is determined that the data defines a second loading routine provided to replace the first loading routine, and the first loading routine is replaced with the second loading routine in accordance with this determination. In one embodiment of this feature, the second loading routine includes a number of compressed controller instructions, and a number of uncompressed controller instructions are generated from the compressed controller instructions to execute the second loading routine.

Accordingly, one object of the present invention is to provide improved programming techniques for a control system of an internal combustion engine.

Another object is to provide a technique to manage memory space of an internal combustion engine control system.

It is further object to conserve nonvolatile memory space of an internal combustion engine control system by compressing at least a portion of the controller instructions.

An additional object of the present invention is to provide a programming technique to replace an external data loading program for an embedded internal combustion engine control system.

Further objects, aspects, features, benefits, and advantages of the present invention shall become apparent from the detailed description and drawings provided herewith.

DESCRIPTION OF THE PREFERRED EMBODIMENT

Figure 1:
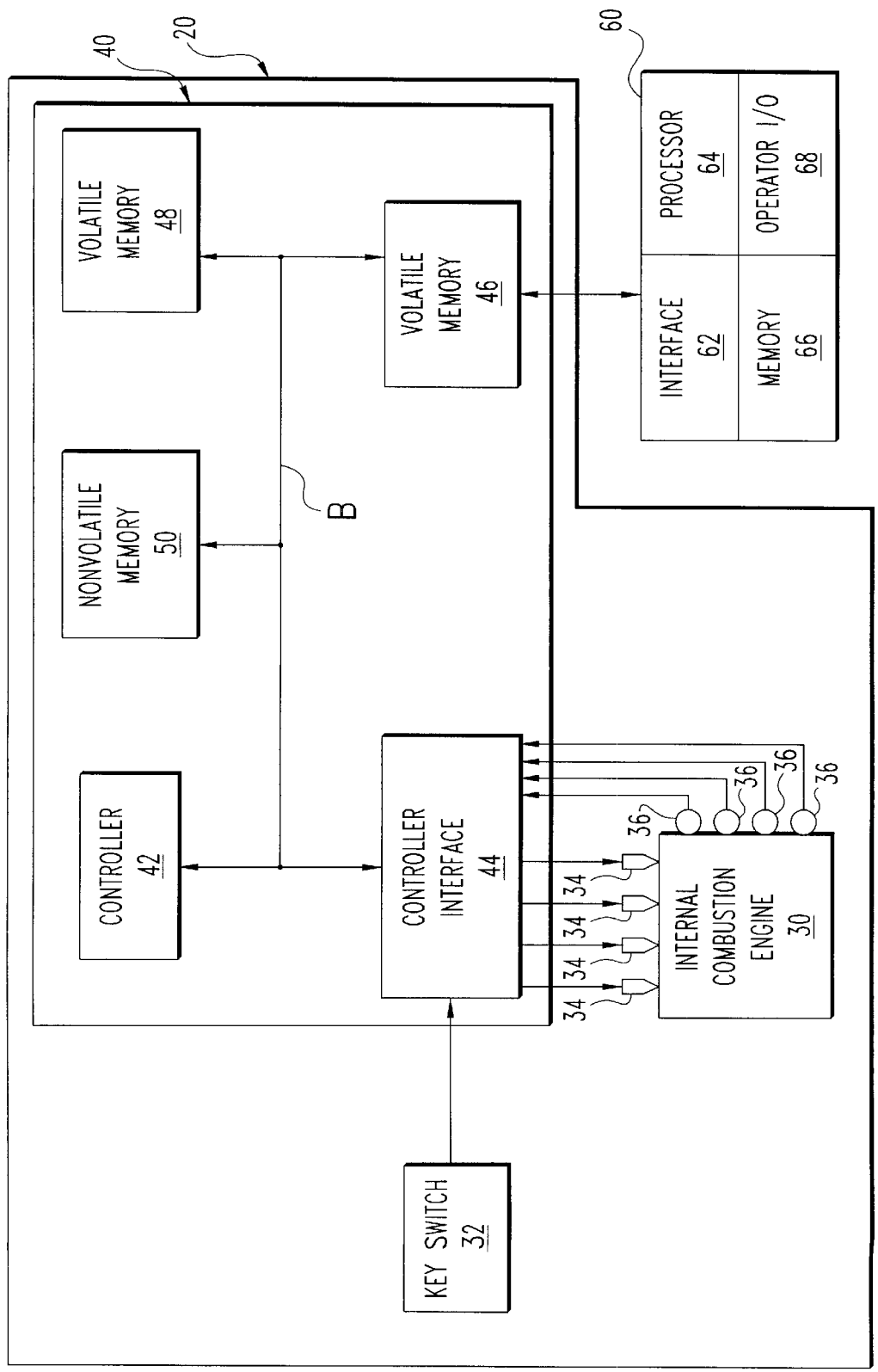
FIG. 1 is a schematic view of an engine system of the present invention coupled to external support equipment.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described devices, processes, and techniques, and any further applications of the principles of the invention as described herein are contemplated as would normally occur to one skilled in the art to which the invention relates.

FIG. 1 illustrates engine system 20 of one embodiment of the present invention. System 20 includes internal combustion engine 30 and keyswitch 32 operatively coupled to embedded control system 40. Preferably, keyswitch 32 is manually operable and provides a discrete activation signal corresponding to a desired "on" or "off" status of system 20. Engine 30 is coupled to control system 40 through a number of actuators 34 which are responsive to control signals output by control system 40 and a number of sensors 36 which provide corresponding sensor signals to control system 40.

Control system 40 includes controller 42 coupled by a digital communication bus B to control interface 44. Controller 42 may be an electronic circuit comprised of one or more components. Similarly, controller 42 may be comprised of digital circuitry, analog circuitry, or both. However, controller 42 is preferably a digitally programmable device of conventional design suitable for engine control applications.

Also coupled to bus B are volatile memory 48, and nonvolatile memory 50. Volatile memory 48 is preferably comprised of one or more devices of the static Random Access Memory (RAM) variety; however, other nonvolatile memory types known to those skilled in the art may be utilized. Preferably, nonvolatile memory 50 is provided by one or more "flash" type memory devices which do not require an external power source to retain memory contents during power-down periods. This preferred flash memory offers fast, random location read times, but random location write cycles may be more constrained. To provide for more a more rapid write capability, the preferred flash memory also offers a block erase and block write capability. One preferred flash memory device for the present invention is designated by model AB28F400BR and is supplied by Intel Corporation having a business address of 2200 Mission College Blvd., Santa Clara, Calif. 95052. Alternatively, nonvolatile memory 50 may be a battery-backup memory, a bubble memory, or another type of memory as would occur to one skilled in the art.

Control system 40 also includes control interface 44 operatively coupled to bus B. Control interface 44 provides operative connections to keyswitch 32, actuators 34, and sensors 36 and includes circuitry necessary to interface keyswitch 32, actuators 34, and sensors 36 with control system 40. For example, control interface may include a driver with a digital-to-analog conversion capability for each actuator 34, an analog-to-digital converter for each sensor 36 as appropriate, and circuitry to reliably detect the activation signal of keyswitch 32. By way of example, actuators 34 may be electronically controlled fuel injectors or spark plugs responsive to signals from controller 42 generated via control interface 44. Sensors 36 may include a throttle plate or accelerator, intake manifold temperature or pressure sensor, an engine crank angle sensor, an angular cam position sensor, coolant temperature probe, or an exhaust gas oxygen sensor to name a few. Preferably, actuators 34 and sensors 36 are of a conventional type suitable for interfacing to control system 40.

Figure 2:
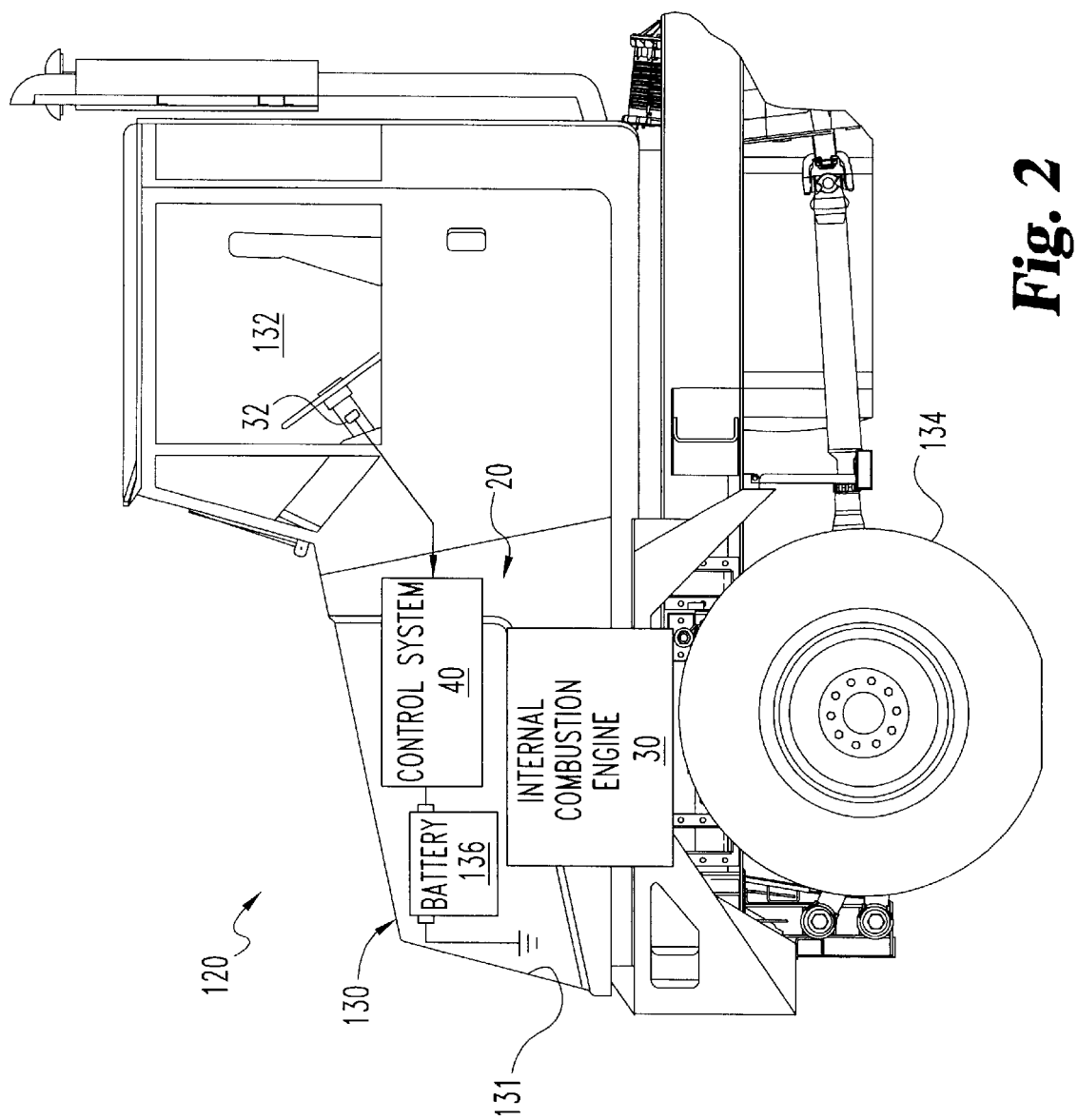
FIG. 2 is a partial diagrammatic view of the engine system of FIG. 1 arranged in a vehicle.

FIG. 2 illustrates a portion of vehicle system 120. Vehicle system 120 includes vehicle 130 housing system 20 with like reference numerals representing like features. Internal combustion engine 30 and control system 40 are positioned in engine compartment 131 of vehicle 130 and keyswitch 32 is shown in driver compartment 132 of vehicle 130. A ground engaging wheel 134 of vehicle 130 is also illustrated. Preferably, internal combustion engine 30 is of the conventional four-cycle variety and is either spark or compression ignited. It is also preferred that internal combustion engine 30 include a number of reciprocating pistons rotatably coupled to a crankshaft in a conventional arrangement to power vehicle 130 and auxiliary devices as needed. Preferably, control system 40 is powered by a DC voltage supplied from battery 136 which is in turn charged by operation of engine 30 via an alternator (not shown) in a conventional manner.

When engine 30 is running, control system 40 regulates a number of different operations of engine system 20 by executing various routines with controller 42 from memory 48 or memory 50. Generally these routines process sensor signals from sensors 36 and generate control signals to adjust actuators 34 accordingly. Conventional application routines executed by controller 42 in this manner may include engine fueling and timing programs, emission reduction algorithms, digital filter and compensator algorithms, and engine malfunction monitoring programs to name a few.

Returning to FIG. 1, engine system 20 is shown operatively coupled to external support equipment 60 via communication interface 46. Communication interface 46 is coupled to controller 42, interface 44, memory 48, and memory 50 via bus B. Preferably, interface 46 includes a digital serial communications port of a conventional variety.

Support equipment 60 includes a communication interface 62, processor 64, memory 66, and operator I/O 68. Interface 62 is coupled to interface 46 to facilitate communications with support equipment 60. It is preferred that processor 64 be of a conventional microprocessor variety with corresponding support chips and interconnections. The processor circuitry may comprise digital circuits, analog circuits, or a combination of these circuit types. Although it is preferred that processor 64 be readily reprogrammable by software, it may also be programmed by firmware, be configured as an integrated state machine, or employ a combination of these techniques.

Preferably, memory 66 is of the electronic (e.g. solid state), magnetic, or optical variety of the type readily available for use with electronic controllers or processors. Furthermore, Memory 66 may include an optical disk memory (CD), electromagnetic hard or floppy disk media, or a combination of these. Also, memory 66 may be integrally associated with support equipment 60, or be remotely accessed via a communication link with support equipment 60. Preferably, operator I/O 68 includes a conventional alphanumeric keyboard, a Cathode Ray Tube (CRT) display, and a printer.

In one embodiment, support equipment 60 is configured to service system 20. This embodiment may include programming of processor 64 to monitor system 20 operation, diagnose malfunctions of system 20, and periodically load new calibration constants into memory 50 when system 20 reaches a predetermined age or total operating time. In another embodiment, support equipment 60 is additionally or alternatively configured to download, debug, and test programming for control system 40 as more fully discussed hereinafter.

Figure 3:
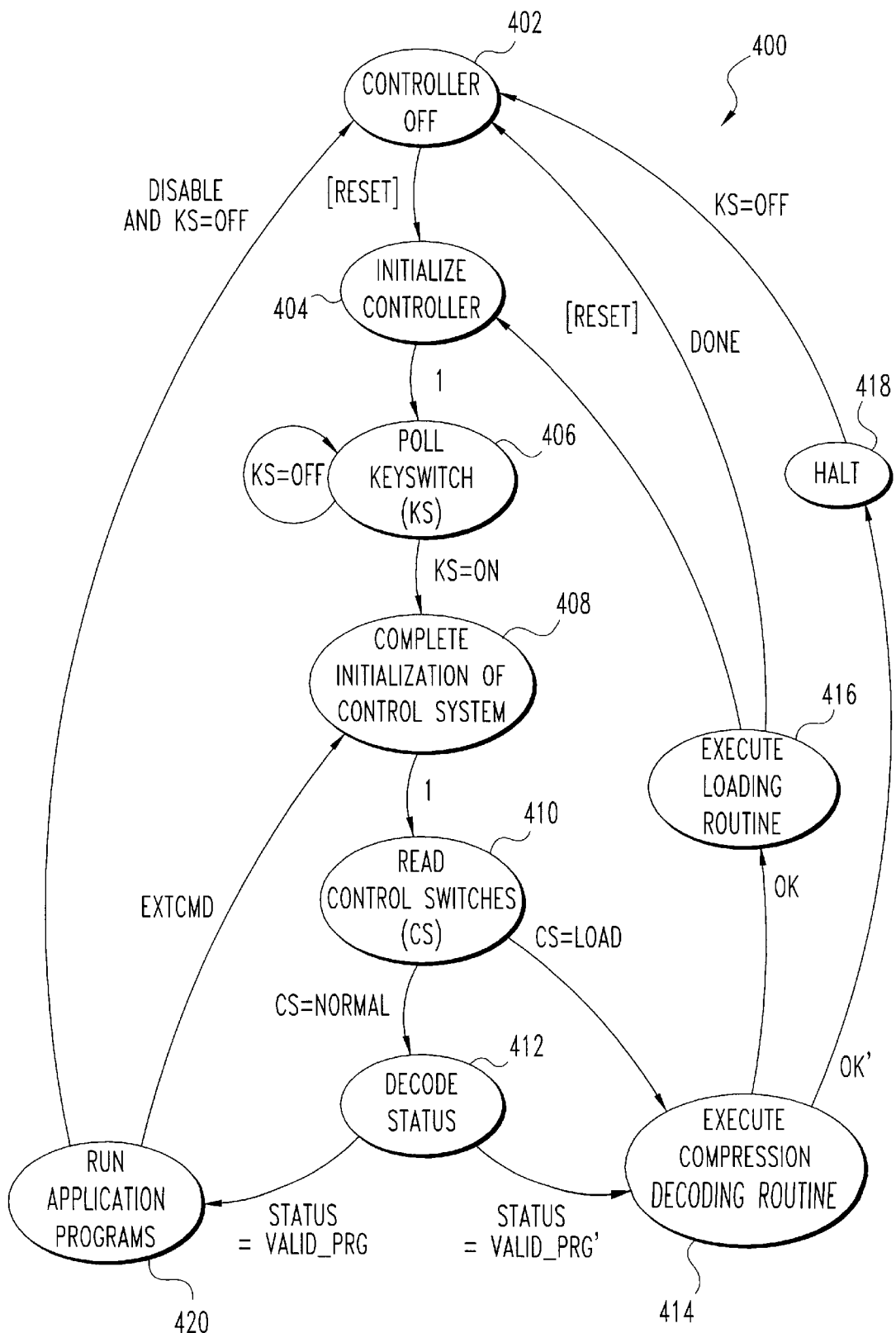
FIG. 3 is a state diagram describing selected operations of the engine system of FIG. 1.

FIG. 3 is a state diagram 400 describing selected operational aspects of control system 40. State diagram 400 starts with state 402 in which controller 42 is nonoperational. This state is typically engaged when engine 30 is not being used. For example, for vehicle system 120, state 402 would be applicable when vehicle 130 is parked and not running.

Figure 4:
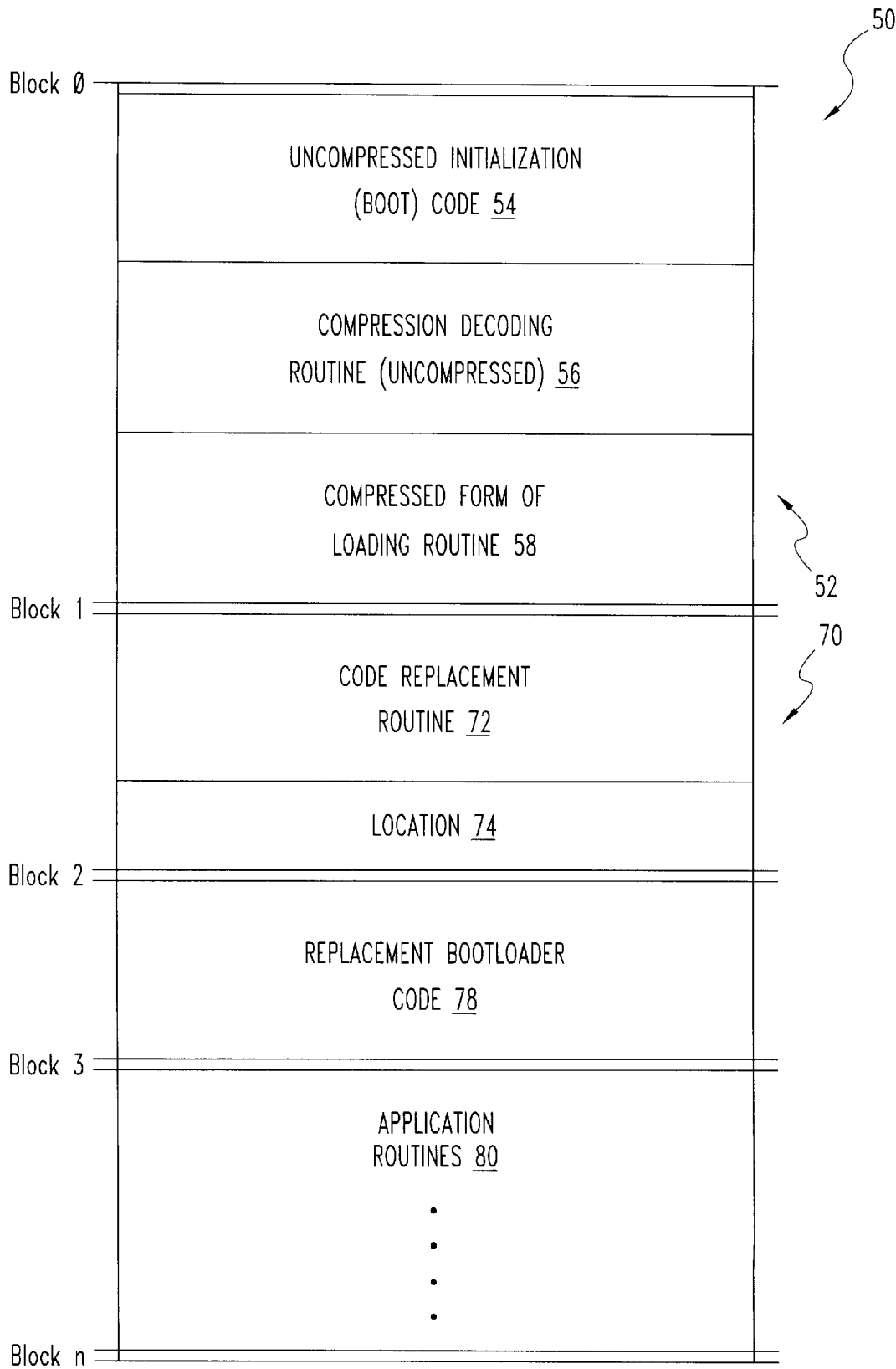
FIG. 4 is a memory map of a nonvolatile memory included in the engine system of FIG. 1.

When power is supplied to controller 42, or when controller 42 is restarted by a RESET signal, a transition occurs to state 404. In state 404, controller 42 is initialized. This initialization may include loading various internal registers of controller 42 as needs require. Referring additionally to FIG. 4, a memory map of nonvolatile memory 50 is depicted. This memory map shows block 0 though block "n" of nonvolatile memory 50. In block 0, a bootloader code segment 52 is indicated which is comprised of uncompressed initialization code segment 54, compression decoding routine 56 (also in uncompressed form), and loading routine 58 in an unexecutable compressed form. For the preferred embodiment utilizing the model A28F400BR flash variety of device for memory 50, block 0 includes 16 Kbyte of addressable eight bit bytes which may be block erased and rewritten to reduce write time compared to byte-by-byte write access. The other blocks for the A28F400BR flash memory device include two 8 Kbyte parameter blocks, one 96 Kbyte main block, and three 128 Kbyte main blocks. The operation of state 404 is accomplished by executing initialization code segment 54 with controller 42.

Once the initialization of controller 42 is completed, control flows to state 406 and polling of keyswitch 32 is initiated. As long as keyswitch 32, designated by variable KS, remains off (KS=OFF), control system 40 idles at state 406; however, as soon as KS=ON, a transition to state 408 occurs. It should be noted that it is common for the status to be KS=ON before state 406 is reached. In state 408, initialization of control system 40 is completed including the zeroing-out of volatile memory 48. The initialization operations of state 408 are also accomplished by executing segment 54 with controller 42.

Once initialization of control system 40 is complete, control transitions to state 410. In state 410, control switches are read as designated by the variable CS. The control switches of state 410 are typically provided as designated "soft switch" memory locations loaded by support equipment 60 through interface 46, or may alternatively be hardwired through control interface 44. If the control switches are set to correspond to a normal condition (CS=NORMAL), control flows to state 412. In state 412, the variable STATUS is decoded to determine whether a valid application program resides in memory 50, as designated by STATUS=VALID_PRG. On the other hand, if there is no valid application program (STATUS=VALID_PRG'), then control flows to state 414.

In state 414, compression decoding routine 56 is executed. State 414 may similarly be reached if the control switches are set to prompt loading of external information into control system 40 (CS=LOAD). Loading routine 58 resides in memory 50 with its instructions and related data constants in a variable length compressed form to conserve nonvolatile memory space. Loading routine 58 cannot be executed in this form, so it is decompressed by routine 56. If the decompression process of state 414 proves successful, as indicated by the flag OK; then an executable form of loading routine 58 is stored in memory 48. Control flows to state 416 to execute loading routine 58 in its executable form from memory 48. If the compression decoding routine 56 executed in state 414 is unsuccessful, then control transitions to halt state 418 as indicated by the flag OK'. Control system 40 idles in state 418 until keyswitch 32 is turned off (KS=OFF), at which time control flows back to state 402. Compression decoding routine 56 is further described hereinafter in connection with FIG. 7.

Figure 8:
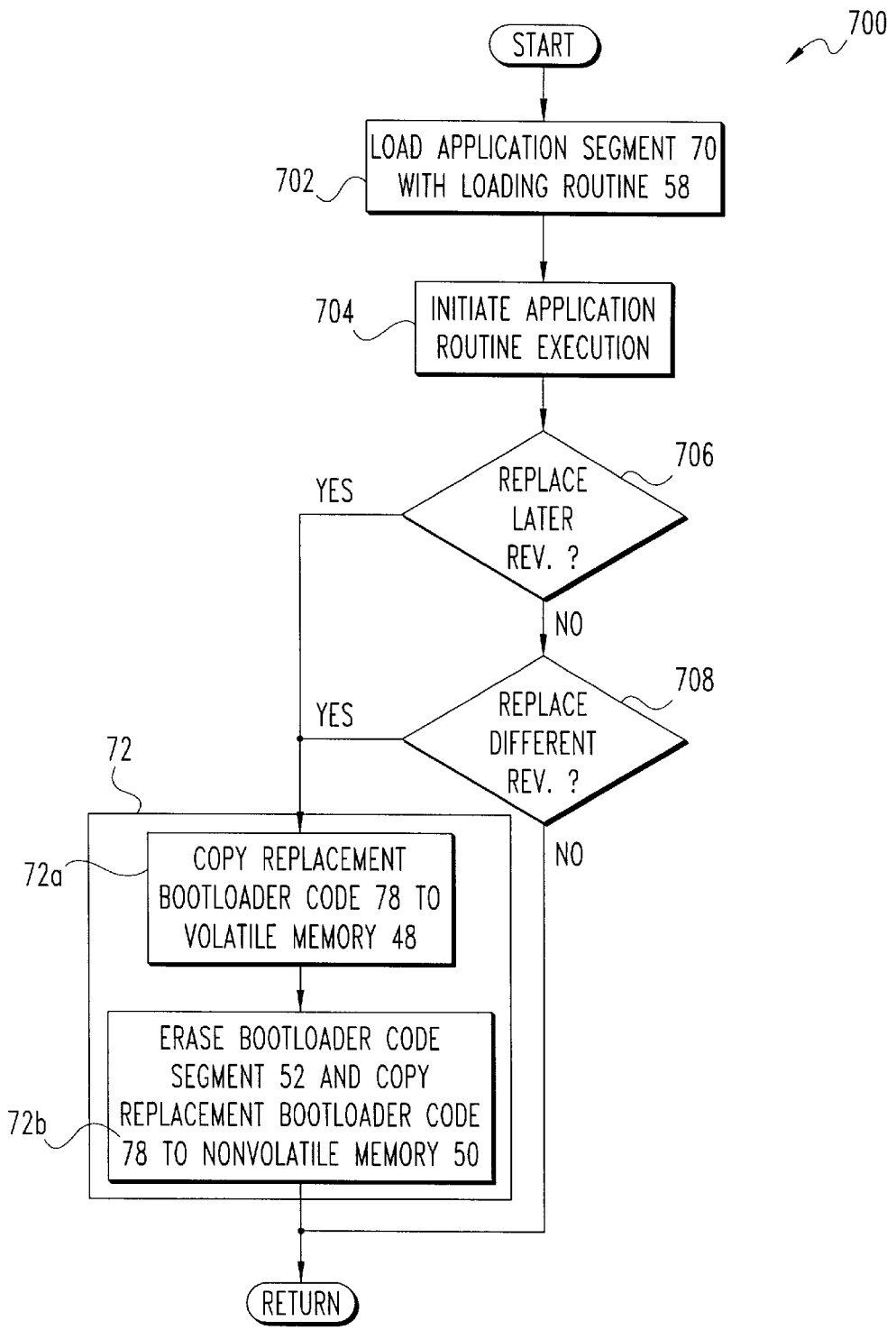
FIG. 8 is a flow chart illustrating a bootloader replacement process for the engine system of FIG. 1.

Returning to state 416, as loading routine 58 is executed, data is exchanged via support equipment 60. This data may include specific commands from support equipment 60 which prompt re-initialization or a reset of controller 42, resulting in transition back to state 404. Typically, loading routine 58 is employed to load calibration data or other parameters for the operation of engine 30 and also to load application routines of the type used to control engine system 20. In addition, loading routine 58 may be used to load code to replace itself as described hereinafter in connection with FIG. 8. If loading routine 58 execution is complete, control returns to state 402 as indicated by the flag DONE.

Referring back to state 412, if STATUS=VALID_PRG, then control flows to state 420 to run application routines 80 from memory 50 (see FIG. 4). If during the course of this execution, a command from the external support equipment 60 is received, as indicated by variable EXTCMD, then control flows back to state 408 to perform a re-initialization of control system 40. If keyswitch 32 is turned off as indicated by KS=OFF, and it has been determined that power to control system 40 may be disabled as indicated by flag DISABLE, then control flows back to state 402. The DISABLE flag is utilized to handle the situation where KS=OFF, but the control system 40 needs to keep running to facilitate a smooth termination of engine operation and perform various power-down sequences, including the storage of relevant information in nonvolatile memory 50 as needed. Once these residual termination tasks have been performed, the DISABLE flag is set so that control can return to state 402.

Figure 5:
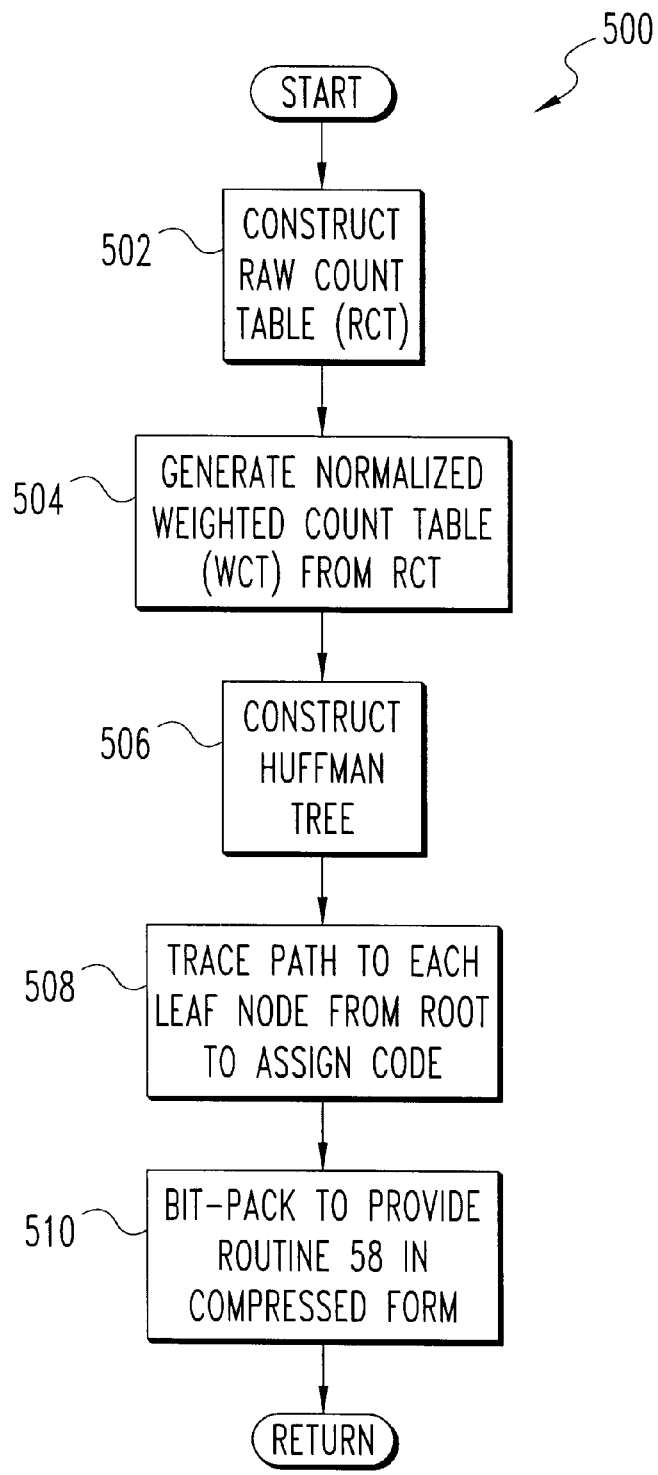
FIG. 5 is a flow chart illustrating a compression routine for use with the engine system of FIG. 1.
Figure 6:
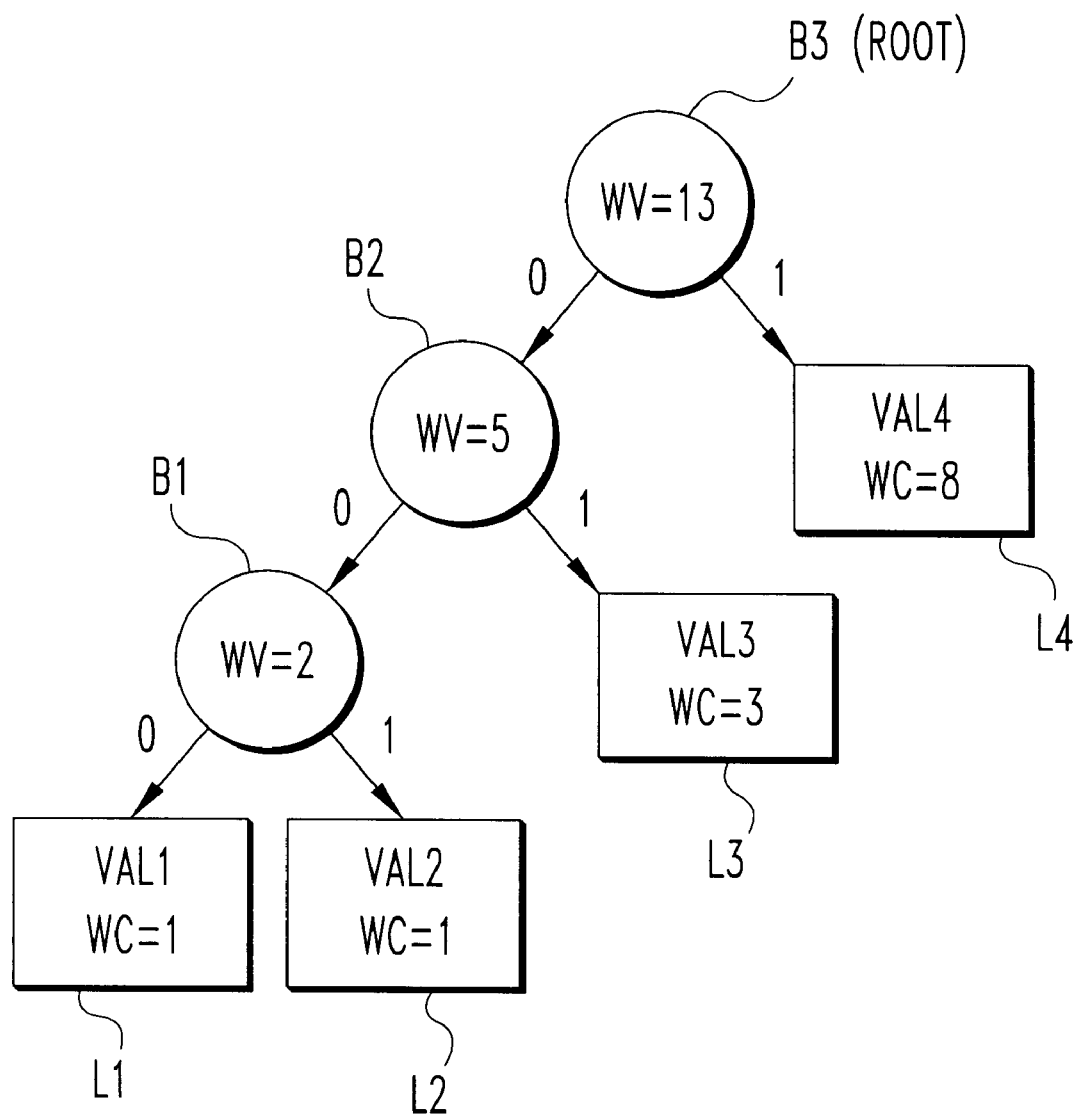
FIG. 6 is a tree diagram illustrating selected aspects of the flow chart of FIG. 5.

Referring to FIGS. 5 and 6, additional details concerning the compression of loading routine 58 are provided. FIG. 5 is a flow chart of compression routine 500 which provides compression codes of varying length to represent unique fixed length values. Typically, the most frequent fixed length values are represented by the shortest codes to provide significant compression. Preferably, routine 500 is executed by equipment external to engine system 20, for example, routine 500 may be embodied in software which is selectively executed by processor 64 of support equipment 60. For this example, the compressed form of loading routine 58 may be downloaded into memory 50 from memory 66 via coupled interfaces 46 and 62.

Routine 500 begins in stage 502 by examining routine 58 in its uncompressed form, which includes a number of instructions suitable for execution by controller 42. This examination includes defining the uncompressed information as a sequence of equally sized, fixed length segments or units. As a consequence, each fixed length unit has the same predetermined bit length (or number of bits) which is represented by the variable "FL". For example, for an eight-bit byte organization the bit length would be eight (FL=8). For a given FL, the number of unique binary values which may be represented by the corresponding bits is $2^{FL}$=MAXVAL. Thus, for FL=8, the number of unique binary values is MAXVAL=$2^{FL}$=$2^8$=256, which corresponds to a binary range of 0–255 decimal (or x00–xFF in base 16, where, as used herein, the "x" prefix indicates a hexadecimal number). Stage 502 constructs a Raw Count Table (RCT) with MAXVAL entries and counts the occurrence of each unique binary value. The contents of each entry is the count for a different one of the unique MAXVAL binary values for the fixed length unit of FL bits. Thus, for example, if the fixed length unit value 154 (x9A) occurs 50 (x32) times in the uncompressed information, then 50 (x32) would be entered in the RCT entry corresponding to the fixed length unit value of 154 (x9A).

Once the RCT is constructed, a Weighted Count Table (WCT) is generated from it in stage 504. Stage 504 identifies the largest count, MAXCNT in the RCT table and normalizes the entries in relation to this count over the range of unique binary values, MAXNUM. For each nonzero count (NZC) entered in RCT, WCT has a corresponding weighted count (WC) entry determined in accordance with the following equation:

$$WC=INT[NZC/((MAXCNT+1)/MAXNUM)];$$

where "INT[ ]" returns the truncated integer value of the argument indicated in the square brackets ("[ ]"), and NZC is a nonzero count entry from the RCT. If the value of WC is greater than zero, but less than one, then the logic sets WC to one (1) to assure that the least frequent values are not ignored. When WCT is completed, each entry of WCT is associated with a unique value for each different fixed length unit value appearing in the uncompressed information. The entries of WCT are all nonzero and normalized to be an integer in the range of 1 through (MAXNUM–1).

In stage 506, a Huffman binary tree is constructed. This tree includes leaf nodes interconnected by branch nodes. One of the branch nodes is a "root" of the tree, with the remaining branch nodes being intermediately positioned between the leaf nodes and the root. The leaf nodes are each assigned a different fixed length unit value represented by an entry in WTC and are also assigned the corresponding weighted count, WC. The branch nodes each have two branches, a binary 0 branch and a binary 1 branch, each of which is connected to a leaf node or a subordinate branch node. Each branch node is assigned a weighted value (WV) equal to the sum of the weighted quantities of the subordinate branch nodes or leaf nodes directly connected by its branches.

FIG. 6 provides a simple example of a Huffman binary tree. The tree of FIG. 6 has leaf nodes L1, L2, L3, L4 connected by branch nodes B1, B2, B3. Node B3 is also the "root" of the FIG. 6 tree. The connecting branches are indicated as arrows with a corresponding 1 or 0 showing the binary value of the branch. The fixed length unit values of the leaf nodes are depicted as VAL1, VAL2, VAL3, VAL4 for leaf nodes L1, L2, L3, L4, respectively. The weighted counts WC, are shown as WC=1, WC=1, WC=3, WC=8 for corresponding leaf nodes L1, L2, L3, L4. The branch nodes B1, B2, B3 have the corresponding weighted values of WV=2, WV=5, WV=13.

To construct a binary tree in stage 506, the entries of WCT are each put in a "free node" list. A pair of list entries having the smallest weighted counts (WCs) is selected. If more than two of the smallest WCs are equal, then any two of the equal WCs may be selected, provided a consistent selection scheme is utilized. A node is formed for each of the two WCs of the pair. The two newly formed nodes are then each connected to the same branch node with the branch having the zero (0) binary value connecting the smallest WC of the pair. This branch node, with its corresponding WV equal to the sum of the weightings for the subordinate pair, is then added to the free node list in place of the nodes connected to its branches. This process is repeated with the modified list for the next pair of list entries having the smallest WC or WV until only one entry remains—the root of the Huffman binary tree. Notably, as the process repeats, the number of free node list entries decreases and the original list entries from the WCT are gradually removed. Upon completion, each entry of the WCT is represented by a leaf node with a unique connection path to the root of the tree through one or more branches.

In stage 508, a compression code is assigned to each leaf node to represent the corresponding fixed length unit value. For each leaf node, the code is assigned by tracing the path from the root to the leaf node and concatenating the sequence of binary values for the branches traversed during the trace. The compression codes have a bit length which varies with the number of branches in the traced path. The sequence of fixed length units are compressed by substituting the corresponding compression code and packing these bit codes together in stage 510 to provide loading routine 58 in compressed form.

For the example of FIG. 6, let FL=3, so that there are MAXNUM=$2^{FL}2^3$=8 unique fixed length unit values (range 0–7). The uncompressed information to be processed by routine 500 for this example is shown in 16 fixed length units as follows (as used herein, the "b" prefix indicates a binary number):

b000 b001 b000 b000
b000 b000 b010 b010
b000 b000 b011 b011
b000 b000 b011 b011

The RCT for this case has only four nonzero count entries of 9, 1, 2, and 4 corresponding to the fixed length unit values b000, b001, b010, and b011. The resulting WCT has the entries of 8, 1, 1, and 3 in correspondence with the nonzero RCT count entries 9, 1, 2, and 4. These weighted counts are shown as WC=1, WC=1, WC=3, WC=8 for leaf nodes L1, L2, L3, L4 of FIG. 6 with VAL1=b001, VAL2=b010, VAL3=b011, VAL4=b000, respectively. By tracing the branches from the root (branch node B3) to each leaf node L1, L2, L3, L4; the compression codes are b000 for VAL1, b001 for VAL2, b01 for VAL3, and b1 for VAL4. After substituting these codes for the uncompressed information and bit-packing in accordance with stage 510, the compressed information results as shown in the following side-by-side comparison:

| Uncompressed | Compressed |
| --- | --- |
| b000 b001 b000 b000 | b100011 |
| b000 b000 b010 b010 | b11001001 |
| b000 b000 b011 b011 | b110101 |
| b000 b000 b011 b011 | b110101 |

For this example, 26 bits of compressed information represent the 48 bits of the uncompressed information.

It should be appreciated that FIG. 6 presents a relatively simple example to enhance illustration of routine 500. In other embodiments, a larger FL and larger count entries in the RCT are expected. Preferably, FL is selected to maximize the compression obtained with routine 500. In one preferred embodiment, FL=8 to accommodate a conventional 8 bit byte storage format.

Once loading routine 58 is provided in a compressed form in accordance with routine 500, the compressed information and the WCT are loaded into memory 50. In one embodiment, WCT is loaded as part of compression decoding routine 56 (see FIG. 4). As shown in the state diagram of FIG. 3, when state 414 is reached, controller 42 executes compression decoding routine 56 to provide executable controller instructions and/or data for loading routine 58 in an uncompressed form in memory 48 for subsequent execution in state 416.

Figure 7:
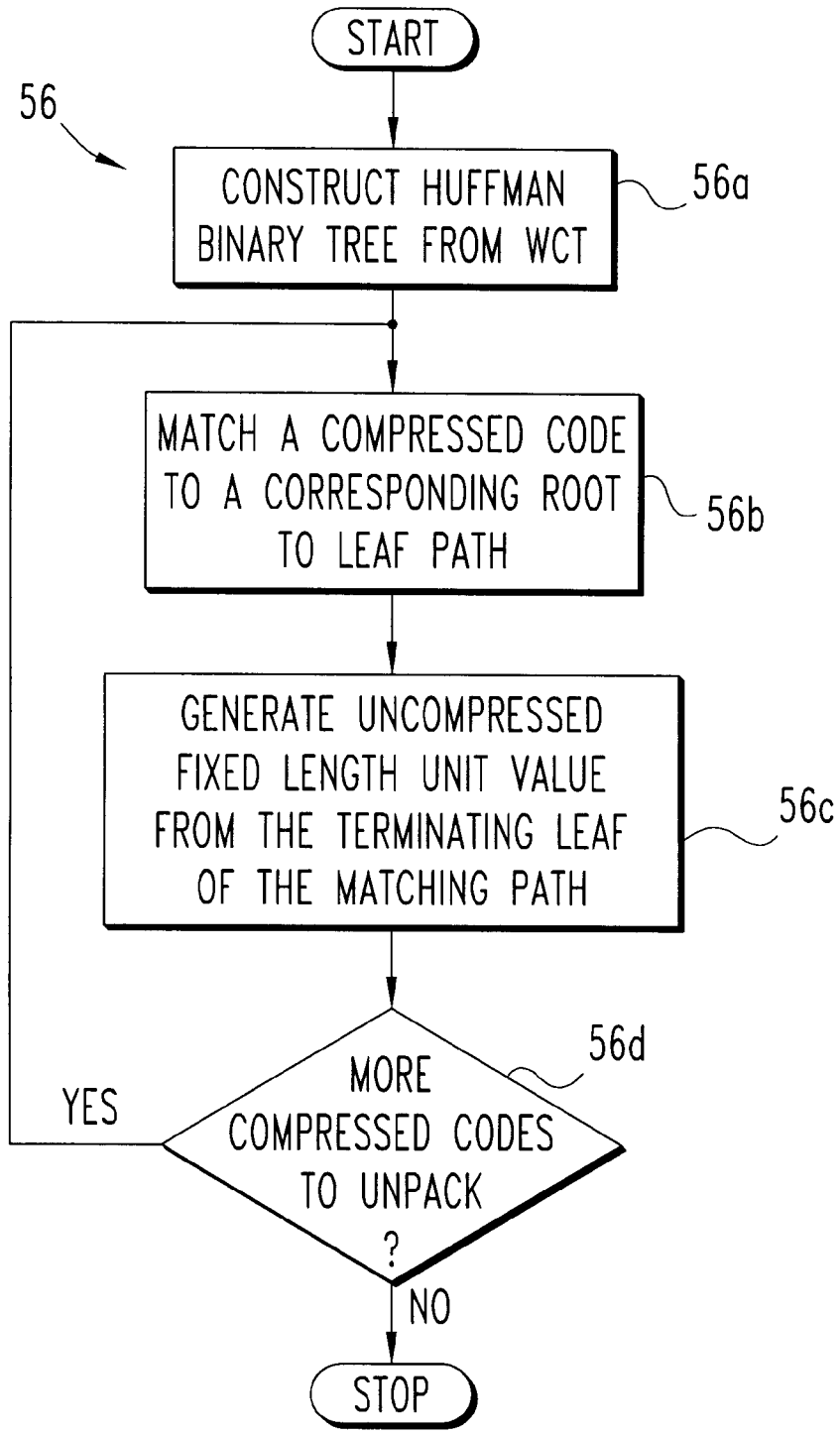
FIG. 7 is a flow chart illustrating a compression decoding routine for the engine system of FIG. 1.

FIG. 7 illustrates selected aspects of routine 56 in flowchart form. In stage 56a of compression decoding routine 56, controller 42 reconstructs the Huffman binary tree from the WCT following the same process described in connection with routine 500. Notably, the selection scheme used to pick the two entries with the smallest WC or WV from the free node list should be the same as the selection scheme utilized when loading routine 58 was compressed.

In stage 56b, the compression code is matched to the corresponding root to leaf node path of the binary tree. In stage 56c, the fixed length unit value corresponding to the leaf node terminating the path is determined. Conditional 56d determines whether there are additional compressed codes to unpack. If there are additional compressed codes, control returns to repeat stages 56b and 56c to trace a corresponding path to the appropriate leaf node to determine the next fixed length unit value in the sequence. Stages 56b, 56c and conditional 56d form a loop which is repeated to rebuild the uncompressed form of routine 58 by sequentially decoding each compression code to the corresponding fixed length unit value. When no compressed codes remain, then loading routine 58 has been uncompressed and routine 56 terminates.

Once compression decoding routine 56 has been successfully performed, routine 58 is in a form suitable for execution by controller 42. Notably, in the compressed form the instructions of loading routine 58 would be unexecutable; however, by retaining routine 58 in an uncompressed form, nonvolatile memory space of control system 40 is conserved. In other embodiments, different routines may be compressed to conserve nonvolatile memory. For example, engine control algorithms or other application routines may be stored in memory 50 either partially or completely compressed. Decompression of such routines could be provided by calling routine 56 modified with an appropriate WCT or through such other techniques as would occur to those skilled in the art.

Loading routine 58 is configured to download information from support equipment 60 (see FIG. 1) through interface 46. This information includes calibration data which may change with the age and degree of use of engine system 20. Also, routine 58 may be executed to update various programs contained in segment 70 of memory 50 as shown in FIG. 4. Another feature of the present invention is to replace the bootloader segment 52 shown in Block 0 of memory 50 in FIG. 4 with new bootloader code. One preferred embodiment directed to this feature is process 700 depicted in FIG. 8. In stage 702 of process 700, loading routine 58 is executed by controller 42 to load data through interface 46 into the multiblock application routine segment 70. This data includes code replacement routine 72 which is executed from segment 70 by controller 42 to replace the contents of block 0 of memory 50 with replacement bootloader code 78. Replacement bootloader code 78 is also included in the data downloaded by routine 58.

In operation 704, application programming is executed from segment 70. The application programming examines a predetermined input to control system 40. Typically, this input is provided as a designated value in a predetermined memory location of memory 50, as represented by location 74. For the illustrated embodiment, one of two predetermined conditions, corresponding to two different designated values of location 74, must be met before a replacement is performed. Conditional 706 checks if location 74 is set to a first value that indicates replacement is to performed if code 78 is a later revision. Consequently, conditional 706 includes comparing revision data for the operating bootloader segment 52 with revision data provided for the replacement bootloader code segment 78 to determine if replacement is indicated. If a later revision replacement is indicated when location 74 is set to the first value, then control flows to routine 72. Otherwise, control flows to conditional 708. Conditional 708 tests location 74 for a second value that indicates replacement any time the revisions are different. Consequently, conditional 708 also includes a comparison of revision data for the operating bootloader code segment 52 and the replacement bootloader code 78 to determine if the revisions differ. If the revisions are different when location 74 is set to the second value, then routine 72 is initiated. If these conditions are not met or the contents of location 74 define a third value different from the first or second value, then process 700 returns to the calling program and process 700 is terminated.

If code replacement routine 72 is executed, then replacement bootloader code 78 is copied to volatile memory 48. Similarly, the code replacement routine is placed in volatile memory 48 to be executed therefrom. In stage 72b, the bootloader segment 52 is erased and the replacement bootloader code in memory 48 is copied into block 0 of memory 50. By copying the replacement bootloader code 78 into memory 48, a block erasure of block 0 of memory 50 may be accomplished when memory 50 is comprised of the preferred flash memory variety previously described. It should be appreciated that a power interruption during replacement of the contents of block 0 of memory 50 may make recovery difficult if not impossible. Thus, the block erasure and transfer of block 0 is preferred to reduce required processing time compared to a byte-by-byte rewrite of this flash variety of nonvolatile memory.

As used herein, it should be appreciated that: "code," "variable," "criterion," "characteristic," "quantity," "amount," "value," "buffer," "constant," "flag," "data," "record," "memory space," "threshold," "input," "output," "pixel," "image" (or a region thereof), "matrix," "command," "table," or "memory location" each generally correspond to one or more signals within processing equipment of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising: an internal combustion engine with a control system, said control system including:
    a programmable controller operatively coupled to said engine to control a number of operations of said engine;
    a nonvolatile memory operatively coupled to said controller, said nonvolatile memory being loaded with digital information including a number of compressed instructions for said controller; and
    a volatile memory operatively coupled to said controller;
    wherein said controller is programmed to execute a compression decoding routine to generate a number of uncompressed controller instructions from said compressed controller instructions, said controller being configured to store said uncompressed controller instructions in said volatile memory and execute said uncompressed controller instructions from said volatile memory during operation of said engine, said compressed controller instructions occupying less memory space than said uncompressed controller instructions.

2. The combination of claim 1, further comprising a keyswitch configured to provide a signal to prompt execution of an initialization routine by said controller, said initialization routine including a number of executable instructions loaded in said nonvolatile memory.

3. The combination of claim 1, further comprising support equipment operatively coupled to said first memory, said support equipment being configured to load said compressed instructions into said nonvolatile memory.

4. The combination of claim 1, wherein said control system includes a communication interface operatively coupled to support equipment external to said control system, and said controller is programmed to download data from said support equipment through said interface by executing a loading routine in response to an input, said loading routine including said uncompressed controller instructions.

5. The combination of claim 4, wherein said controller executes an initialization routine that tests whether to execute said loading routine.

6. The combination of claim 4, wherein said first memory is loaded with a plurality of executable instructions.

7. The combination of claim 1, further comprising a vehicle carrying said engine and said control system.

8. A combination, comprising: an internal combustion engine with an embedded control system, said control system including:
    a programmable controller operatively coupled to said engine to control a number of operations of said engine;
    a communication interface configured for selective coupling to support equipment to receive digital information; and
    a nonvolatile memory operatively coupled to said controller, said nonvolatile memory includes a first loading routine executable by said controller to download data from said support equipment when said support equipment is coupled to said communication interface;
    wherein said controller is responsive to an input to execute a code replacement routine residing in said nonvolatile memory, said code replacement routine being configured to replace said first loading routine with a second loading routine defined by said data downloaded with said first routine.

9. The combination of claim 8, wherein said control system includes a volatile memory operatively, and said controller is configured to load said second routine into said nonvolatile memory from said volatile memory when executing said code replacement routine.

10. The combination of claim 8, wherein said input includes a value provided in said data downloaded by said first loading routine.

11. The combination of claim 8, wherein said first loading routine downloads said data into said nonvolatile memory of said control system.

12. The combination of claim 8, wherein said nonvolatile memory is block eraseable.

13. The combination of claim 8, further comprising a keyswitch operatively coupled to said control system to provide an activation signal thereto, said control system responding to said activation signal to execute an initialization routine stored in said nonvolatile memory.

14. The method of claim 13, wherein said controller is responsive to said input when executing said initialization routine to determine if said second loading routine is a later revision than said first loading routine.

15. A method, comprising:
    operating a control system of an internal combustion engine, the control system being operatively coupled to the engine and including a programmable controller operatively coupled to a first memory and a second memory, a number of compressed instructions for the controller being stored in the first memory of the control system in an unexecutable format;
    providing a number of executable instructions from the compressed instructions by executing a compression decoding routine during said operating; and storing the executable instructions in the second memory during said operating, the executable instructions occupying more memory space than the compressed instructions.

16. The method of claim 15, wherein the first memory is nonvolatile, the second memory is volatile, and the compression decoding routine is executed by the controller.

17. The method of claim 15, wherein the compressed instructions are bit packed in the first memory with a most frequently occurring type of the compressed instructions occupying fewer bits in the first memory than a less frequently occurring type of the compressed instructions.

18. The method of claim 15, further comprising:
operatively coupling support equipment to the control system;
executing an initialization routine with the processor before said providing;
performing said providing in response to a predetermined condition determined with the initialization routine; and
executing a loading routine with the processor from the second memory after said performing to download data from the support equipment, said loading routine including said executable instructions.

19. The method of claim 15, further comprising:
generating the compressed instructions with support equipment external to the control system; and
storing the compressed instructions in the first memory after said generating.

20. The method of claim 19, wherein said generating includes:
encoding the compressed instructions in accordance with Huffman binary tree;
establishing a table of values from the tree for decompressing the compressed instructions;
providing the table to the first memory with the support equipment; and
accessing the table during execution of the compression decoding routine, the compression decoding routine being executed by the controller.

21. The method of claim 15, wherein the compressed instructions are provided by a variable length compression routine, and further comprising:
accessing the first memory in response to initiating operation of the control system, the first memory being nonvolatile to store digital information including the compressed instructions and a plurality of uncompressed controller instructions in an executable format;
performing an initialization routine with the processor composed of the uncompressed controller instructions;
executing a data loading routine with the controller, the data loading routine including the executable instructions.

22. A method, comprising:
operating an embedded control system of an internal combustion engine, the control system being operatively coupled to the engine and including a programmable controller operatively coupled to a nonvolatile memory loaded with digital information, the digital information including a number of compressed controller instructions to conserve nonvolatile memory space of the control system;
performing a first routine with the controller during said operating to generate a number of uncompressed controller instructions from the compressed controller instructions; and
executing the uncompressed controller instructions with the controller during said operating.

23. The method of claim 22, further comprising storing the uncompressed controller instructions in a volatile memory operatively coupled to the controller.

24. The method of claim 22, further comprising initiating said operating by turning a keyswitch operatively coupled to the control system.

25. The method of claim 22, further comprising:
generating the compressed controller instructions with support equipment external to said control system; and
storing the compressed controller instructions in the nonvolatile memory after said generating.

26. The method of claim 22, further comprising:
accessing the nonvolatile memory to establish a second routine, the second routine including the uncompressed controller instructions;
loading the second routine in a volatile memory; and
executing the second routine with the controller by accessing the volatile memory.

27. The method of claim 22, further comprising:
operatively coupling the support equipment to the control system; and
loading data from the support equipment into the control system by executing the second routine.

28. A method, comprising:
operatively interfacing support equipment with an embedded control system of an internal combustion engine, the control system being operatively coupled to the engine and including a programmable controller operatively coupled to a nonvolatile memory;
downloading data from the support equipment by executing a first loading routine with the controller, the first loading routine residing in the nonvolatile memory;
determining the data defines a second loading routine provided to replace the first loading routine; and
executing a code replacement routine with the controller after said downloading to replace the first loading routine with the second loading routine in accordance with said determining.

29. The method of claim 28, wherein the code replacement routine includes loading the second loading routine from the volatile memory into the nonvolatile memory.

30. The method of claim 28, wherein said executing includes determining if the first loading routine is a different revision than the first loading routine.

31. The method of claim 28, further comprising initializing the control system before said downloading, said downloading being performed in response to a condition tested during said initializing.

32. The method of claim 28, further comprising loading calibration data into the nonvolatile memory from the support equipment by executing the second loading routine after said replacing.

33. The method of claim 28, further comprising replacing initialization programming for the controller when the first loading routine is replaced by the second loading routine.

34. The method of claim 33, further comprising storing the initialization programming and the second loading routine in a contiguous block of nonvolatile memory.

35. A method, comprising:
operatively interfacing support equipment with an embedded control system of an internal combustion engine, the control system being operatively coupled to the engine and including a programmable controller operatively coupled to a nonvolatile memory;

downloading data from the support equipment by executing a first loading routine with the controller, the first loading routine residing in the nonvolatile memory;

executing a code replacement routine with the controller after said downloading to replace the first loading routine with the second loading routine in the nonvolatile memory, the second loading routine including a number of compressed controller instructions;

generating a number of uncompressed controller instructions from the compressed controller instructions to execute the second loading routine; and receiving information from the support equipment by executing the second loading routine with the controller.

36. The method of claim 35, wherein the code replacement routine loads the second loading routine into the nonvolatile memory from a volatile memory operatively coupled to the controller.

37. The method of claim 35, wherein said executing includes comparing revision data for the first loading routine and the second loading routine.

38. The method of claim 35, further comprising:

replacing initialization programming for the controller when the first loading routine is replaced by the second loading routine; and storing the initialization programming and the second loading routine in a contiguous block of nonvolatile memory.

39. The method of claim 35, further comprising:

storing the uncompressed controller instructions in a volatile memory operatively coupled to the controller; and accessing the volatile memory during execution of the second loading routine.

40. The method of claim 35, further comprising powering a vehicle with the engine.

* * * * *